US012626092B2

(12) United States Patent
Kucher et al.

(10) Patent No.: US 12,626,092 B2
(45) Date of Patent: May 12, 2026

(54) METHOD FOR LEARNING SYNAPTIC WEIGHT VALUES OF A NEURAL NETWORK, RELATED DATA PROCESSING METHOD, COMPUTER PROGRAM, CALCULATOR AND PROCESSING SYSTEM

(71) Applicant: Commissariat à l'énergie atomique et aux énergies alternatives, Paris (FR)

(72) Inventors: Inna Kucher, Gif sur Yvette Cedex (FR); David Briand, Gif sur Yvette Cedex (FR); Olivier Bichler, Gif sur Yvette Cedex (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 752 days.

(21) Appl. No.: 18/058,422

(22) Filed: Nov. 23, 2022

(65) Prior Publication Data

US 2023/0162000 A1 May 25, 2023

(30) Foreign Application Priority Data

Nov. 24, 2021 (FR) ..................................... 21 12441

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
CPC .......... G06N 3/04; G06N 3/08; G06N 3/0495; G06N 3/0464; G06N 3/048; G06N 3/084; G06N 3/063
See application file for complete search history.

(56) References Cited

U.S. PATENT DOCUMENTS

| | | | |
|---|---|---|---|
| 11,373,087 B2 * | 6/2022 | Yim | G06N 3/047 |
| 12,008,467 B2 * | 6/2024 | Yang | G06N 3/063 |

(Continued)

FOREIGN PATENT DOCUMENTS

| | | | | |
|---|---|---|---|---|
| CN | 113420788 A | | 9/2021 | |
| GB | 2582519 A | * | 9/2020 | G06N 3/045 |

(Continued)

OTHER PUBLICATIONS

French Preliminary Search Report Issued Jul. 27, 2022 in French Application 21 12441 filed on Nov. 24, 2021 (with English Translation of Categories of Cited Documents), 4 pages.

(Continued)

*Primary Examiner* — Asher D Kells
(74) *Attorney, Agent, or Firm* — Oblon, McClelland, Maier & Neustadt, L.L.P.

(57) ABSTRACT

Method for learning synaptic weight values of a neural network, related data processing method, computer program, calculator and processing system The invention relates to a method for training synaptic weight values of at least one layer of an artificial neural network.

The method is computer-implemented, and comprises training the weight values from training data, each weight value from said training being a quantized weight value belonging to a set of quantized values.

The set of quantized values consists of values encoded with a predefined number B of bits, and with a quantization step P between two successive quantized values that satisfies:

$$P = \frac{1}{\left\lceil \frac{2^B - 1}{2} \right\rceil}$$

(Continued)

where $\lfloor \cdot \rfloor$ represents the integer part function;

the quantized values also being included in a predefined interval chosen from the interval $[-1-P; 1]$ and the interval $[-1; 1]$.

21 Claims, 4 Drawing Sheets

(56) References Cited

U.S. PATENT DOCUMENTS

| | | | |
|---|---|---|---|
| 2019/0347550 A1* | 11/2019 | Jung | B25J 9/161 |
| 2020/0057934 A1* | 2/2020 | Yoo | G06N 3/063 |
| 2020/0242473 A1* | 7/2020 | de Vangel | G06N 3/063 |
| 2020/0257966 A1* | 8/2020 | Dumoulin | G06N 3/082 |
| 2021/0264279 A1* | 8/2021 | Esser | G06F 17/16 |
| 2022/0114413 A1 | 4/2022 | Qi et al. | |
| 2022/0303176 A1* | 9/2022 | Pandey | G06F 9/5016 |
| 2023/0075514 A1* | 3/2023 | Wiedemann | G06F 17/16 |

FOREIGN PATENT DOCUMENTS

| | | | |
|---|---|---|---|
| WO | WO 2020/256836 A1 | 12/2020 | |
| WO | WO-2024261091 A1 * | 12/2024 | G06N 3/0985 |

OTHER PUBLICATIONS

Jacob, B. et al., "Quantization and Training of Neural Networks for Efficient Integer-Arithmetic-Only Inference", arXiv:1712.05877v1 [cs.LG], 2017, 14 pages.

Thibault, A. et al., "Disentangled Loss for Low-Bit Quantization-Aware Training", https://openaccess.thecvf.com/content/CVPR2022W/ECV/papers/Allenet_Disentangled_Loss_for_Low-Bit_Quantization-Aware_Training_CVPRW_2022_paper.pdf, 2022, 5 pages.

Jin, Q. et al., "Towards Efficient Training for Neural Network Quantization", arXiv:1912.10207v1 [cs.CV], 2019, 17 pages.

Zhou, S. et al. "DoReFa-Net: Training Low Bitwidth Convolutional Neural Networks with Low Bitwidth Gradients", arXiv:1606.06160v1 [cs.NE], 2016, 13 pages.

* cited by examiner

100

Training of the artificial neural network                    200

First training of weight values

Second training of weight values, among a set of
quantized values and from bounded weight values,
obtained during the first training                            210

150

Inference of the artificial neural network

METHOD FOR LEARNING SYNAPTIC WEIGHT VALUES OF A NEURAL NETWORK, RELATED DATA PROCESSING METHOD, COMPUTER PROGRAM, CALCULATOR AND PROCESSING SYSTEM

CROSS-REFERENCE TO RELATED APPLICATIONS

This application is a U.S. non-provisional application claiming the benefit of French Application No. 21 12441, filed on Nov. 24, 2021, which is incorporated herein by reference in its entirety.

FIELD

The present invention relates to a method for training synaptic weight values of at least one layer of an artificial neural network, each artificial neuron of a respective layer being adapted to perform a weighted sum of input value(s) and then to apply an activation function to the weighted sum to provide an output value, each input value being received from a respective element connected to an input of said neuron and multiplied by a synaptic weight associated with the connection between said neuron and the respective element, the respective element being an input variable of the neural network or a neuron of a preceding layer of the neural network.

The method is computer-implemented, and comprises training the weight values of the neural network from training data, each weight value from said training being a quantized weight value belonging to a set of quantized values.

The invention further relates to a data processing method, in particular for classifying data, the method being implemented by an electronic calculator implementing such an artificial neural network.

A further object of the invention is a non-transitory computer-readable medium including a computer program comprising software instructions which, when executed by a computer, implement such a training method.

The invention also relates to an electronic calculator for processing data, in particular for classifying data, via the implementation of such an artificial neural network; as well as an electronic system for processing object(s), comprising a sensor and such an electronic calculator connected to the sensor, the calculator being configured to process each object from the sensor.

The invention relates to the field of training artificial neural networks, also known as ANNs. Examples of artificial neural networks are convolutional neural networks, also known as CNNs, recurrent neural networks, such as Long Short-Term Memory (LTSM), or Transformer neural networks, typically used in the field of automatic language processing (ALP).

The invention further relates to the field of electronic calculators, also known as chips, for implementing such neural networks, these electronic calculators making it possible to use the neural network during an inference phase, after a prior phase of training the neural network from training data, the training phase typically being implemented by computer.

BACKGROUND

A known technique for significantly reducing a memory footprint during the training phase is based on network quantization. Quantization involves reducing the number of bits used to encode each synaptic weight, so that the total memory footprint is reduced by the same factor.

The article "*Towards Efficient Training for Neural Network Quantization*" by Q. Jin et al describe a training method of the above type, with quantization of synaptic weight values, also known as Scale-Adjusted Training (SAT), which allows the compression of weights and activations to a reduced number of state levels that can be represented in a predefined number of bits, typically no more than 8 bits.

During training, weights and activations are represented as a floating point and on the interval $[-1,1]$ for weights and the interval $[0,+\infty]$ for activations when the activation function is of the rectified linear unit type, also noted ReLU (or the interval $[0, \alpha]$ for activations quantized with the SAT method). The weight quantization algorithm used by the SAT method is described in the article "DoReFa-Net: Training Low Bitwidth Convolutional Neural Networks with Low Bitwidth Gradients" by S. Zhou et al, also called the DoReFa algorithm.

However, the results obtained with such a method are insufficient when the neural network is implemented with integer and/or fixed-point operators and integer and/or fixed-point registers.

SUMMARY

The aim of the invention is then to propose a method of training a neural network which thereafter allows inference of said network with integer and/or fixed-point operators and integer and/or fixed-point registers.

To this end, the invention relates to a method for training synaptic weight values of at least one layer of an artificial neural network, each artificial neuron of a respective layer being adapted to perform a weighted sum of input value(s) and then to apply an activation function to the weighted sum to provide an output value, each input value being received from a respective element connected to an input of said neuron and multiplied by a synaptic weight associated with the connection between said neuron and the respective element, the respective element being an input variable of the neural network or a neuron of a preceding layer of the neural network, the method being computer-implemented and comprising the following step:

training the weight values of the neural network from training data, each weight value from said training being a quantized weight value belonging to a set of quantized values;

the set of quantized values consisting of values encoded with a predefined number B of bits, and with a quantization step P between two successive quantized values that satisfies:

$$P = \frac{1}{\left\lfloor \frac{2^B - 1}{2} \right\rfloor}$$

where $\lfloor \cdot \rfloor$ represents the integer part function;

the quantized values also being included in a predefined interval, also called the quantization interval, the quantization interval being chosen from the interval $[-1-P; 1]$ and the interval $[-1; 1]$.

The training method according to the invention then allows the weighted sum of input value(s) to be performed, and then the activation function to be applied to the weighted sum via integer and/or fixed-point operators and integer and/or fixed-point registers, without compromising the performance acquired during training. In comparison, the results obtained for such a calculation with integer and/or fixed-point registers are too poor to be implemented with the prior art training method, which must then be implemented with floating-point operators and registers.

Quantization according to the invention then allows the use of fixed=point encoding, rather than floating-point encoding. In other words, operations can be performed using integer data types, rather than floats. This allows for a much more efficient implementation of neural network inference, as integer operations require much less computation on most processor cores, including microcontrollers.

Preferably, according to the invention, the set of quantized values includes the null value, whereas the DoReFa quantization algorithm uses a uniform quantization centred on zero, without including the null value. The prior art DoReFa algorithm implies that any quantized weight is either positive or negative. In addition, the DoReFa algorithm must use an encoding of type A*x+B to represent the value, and the offset related to the constant B additionally causes extra operations in a hardware architecture, or extra computation time in a software architecture.

In other beneficial aspects of the invention, the method for learning comprises one or more of the following features, taken in isolation or in any technically possible combination:

the set of quantized values includes the null value;

the set of quantized values satisfies the following equation:

$$EQA=\{-1-P+i\cdot P;i\in[0;2^{B}-1]\}=\{P;i\in[-2^{B-1};2^{B-1}-1]\}$$

the quantization interval being then equal to the interval [−1−P; 1].

the set of quantized values satisfies the following equation:

$$EQS=\{-1+i\cdot P;i\in[0;2^{B}-2]\}=\{i\cdot P;i\in[-(2^{B-1}-1);2^{B-1}-1]\}$$

the quantization interval being then equal to the interval [−1; 1].

the method further comprises the following steps:

+ initial training of the weight values of the neural network from the training data, each learned weight value being furthermore converted, via a transpose function, into a bounded weight value belonging to a predefined interval, also called the bounding interval;

the training step being carried out after the initial training step and from the bounded weight values obtained during the initial training; the initial training step forming a first training of the neural network, and the training step forming a second training of the neural network, subsequent to the first training;

the bounding interval preferably being equal to the quantization interval;

the transpose function satisfies the following equation:

$$F_{CA}(W_{i,j})=\left(1+\frac{P}{2}\right)\cdot\left(\frac{\tan h(W_{i,j})}{\max_{r,s}|\tan h(W_{r,s})|}\right)-\frac{P}{2}$$

where $F_{CA}$ represents a first transpose function, also called the asymmetric transpose function;

$W_{i,j}$ represents a weight value from a matrix W of weight values;

P represents the quantization step;

tan h represents the hyperbolic tangent function;

|·| represents the absolute value function;

max represents the maximum function;

the quantization interval being then equal to the interval [−1−P; 1];

the transpose function satisfies the following equation:

$$F_{CS}(W_{i,j})=\frac{\tan h(W_{i,j})}{\max_{r,s}|\tan h(W_{r,s})|}$$

where $F_{CS}$ represents a second transpose function, also called the symmetric transpose function;

$W_{i,j}$ represents a weight value from a matrix W of weight values;

tan h represents the hyperbolic tangent function;

|·| represents the absolute value function;

max represents the maximum function;

the quantization interval being then equal to the interval [−1; 1].

in the training step, each trained weight value is converted via a quantization function into the respective quantized weight value belonging to the quantization interval;

the quantization function preferably satisfying the following equation:

$$F_{Q}(W)=P\cdot round\left(\frac{W}{P}\right)$$

where $F_{Q}$ represents the quantization function;

W represents a respective weight value;

P represents the quantization step; and round a rounding operation;

the predefined number B of bits is less than or equal to 8;

the predefined number of bits B preferably being between 3 and 5;

the artificial neural network is configured to process, in particular to classify, data;

the artificial neural network being preferably configured to be implemented by an electronic calculator connected to a sensor, for processing at least one object from the sensor.

The invention further relates to a data processing method, in particular for classifying data, the method being implemented by an electronic calculator implementing such an artificial neural network, the method comprising:

a training phase for the artificial neural network, and an inference phase of the artificial neural network, during which data received at the input of the electronic calculator are processed, in particular classified, via the artificial neural network, previously trained during the training phase, the training phase is performed by implementing a training method as defined above.

The invention also relates to a non-transitory computer-readable medium including a computer program comprising software instructions, which, when carried out by a computer, implement a training method as defined above.

The present invention also relates to an electronic calculator for processing data, in particular for classifying data, via the implementation of an artificial neural network, each artificial neuron of a respective layer of the neural network being adapted to perform a weighted sum of input value(s) and then to apply an activation function to the weighted sum to provide an output value, each input value being received from a respective element connected to an input of said neuron and multiplied by a synaptic weight associated with the connection between said neuron and the respective element, the respective element being an input variable of the neural network or a neuron of a preceding layer of the neural network, the calculator comprising:

an inference module configured to infer the previously trained artificial neural network, for processing, in particular classification, of data received as input from the electronic calculator, the previously trained artificial neural network being obtained from a computer program as defined above.

In other beneficial aspects of the invention, the calculator comprises one or more of the following features, taken in isolation or in any technically possible combination:

the inference module is configured to perform the weighted sum of input value(s) and then apply an activation function to the weighted sum via integer and/or fixed=point operators and integer and/or fixed-point registers;

the registers being preferably registers of up to 8 bits;

the trained quantized weight values being preferably multiplied by an integer multiple equal to $$\left\lfloor \frac{2^B - 1}{2} \right\rfloor$$

for the inference of the neural network, with B representing the predefined number of bits used for encoding the quantized weight values and $\lfloor \cdot \rfloor$ representing the integer part function;

the activation function preferably being applied according to the following equation:

$$A(Q) =$$

$$\frac{\alpha_2}{I_2} * \text{round}\left(\frac{I_2}{\alpha_2}\frac{\alpha_1}{J_1}Y\frac{1}{\left\lfloor\frac{I_w}{2}\right\rfloor}Y * \text{clip}\left((Q*n) + \frac{\beta}{Y}\frac{I_1}{\alpha_1}\left\lfloor\frac{I_w}{2}\right\rfloor\right); 0; \frac{I_2}{Y}\frac{I_1}{\alpha_1}\left\lfloor\frac{I_w}{2}\right\rfloor\right)$$

where A represents a global activation function for the fusion of a convolution layer and a subsequent batch normalisation layer;

Q are the weights belonging to the interval $$\left[-\left\lfloor\frac{I_w}{2}\right\rfloor, \left\lfloor\frac{I_w}{2}\right\rfloor\right],$$

$I_1$ is an integer equal to $2^{Bc}-1$, with Bc representing a predefined number of bits used for encoding the previous batch normalisation layer;

$I_2$ is an integer equal to $2^{Bn}-1$, with Bn representing a predefined number of bits used for encoding the current batch normalisation layer;

$I_w$ is an integer equal to $2^{Bw}-1$, with Bw representing a predefined number of bits used for encoding the weights of the convolution layer; n is an integer, corresponding to the output of the rounding operation of the previous layer;

$\beta$ and Y are parameters of the current batch normalization layer;

$\alpha_1$, $\alpha_2$ are parameters of the clip activation function defined below, $\alpha_1$ being associated with the activation function of the previous batch normalization layer and $\alpha_2$ with that of the current batch normalization layer;

$\lfloor \cdot \rfloor$ represents the integer part function;

round represents a rounding operation;

clip represents an activation function that satisfies the following equation:

$$\text{clip}\,(x; 0; \alpha_i) = \frac{1}{2}(|x| - |x - \alpha_i| + \alpha_i)$$

The invention also relates to an electronic object processing system comprising a sensor and an electronic calculator connected to the sensor, the calculator being configured to process at least one object from the sensor, the calculator being as defined above.

BRIEF DESCRIPTION OF THE DRAWINGS

These features and advantages of the invention will appear more clearly upon reading the following description, given solely as a non-limiting example, and made in reference to the attached drawings, in which.

DETAILED DESCRIPTION

In the present description, unless otherwise specified, the expressions "substantially", "about", "approximatively", and "on the order of" define an equality relationship within 10%, preferably within 5%.

In this description, the terms "learning" and "training" are considered equivalent, i.e. they have the same meaning, and are therefore used interchangeably.

Figure 1:
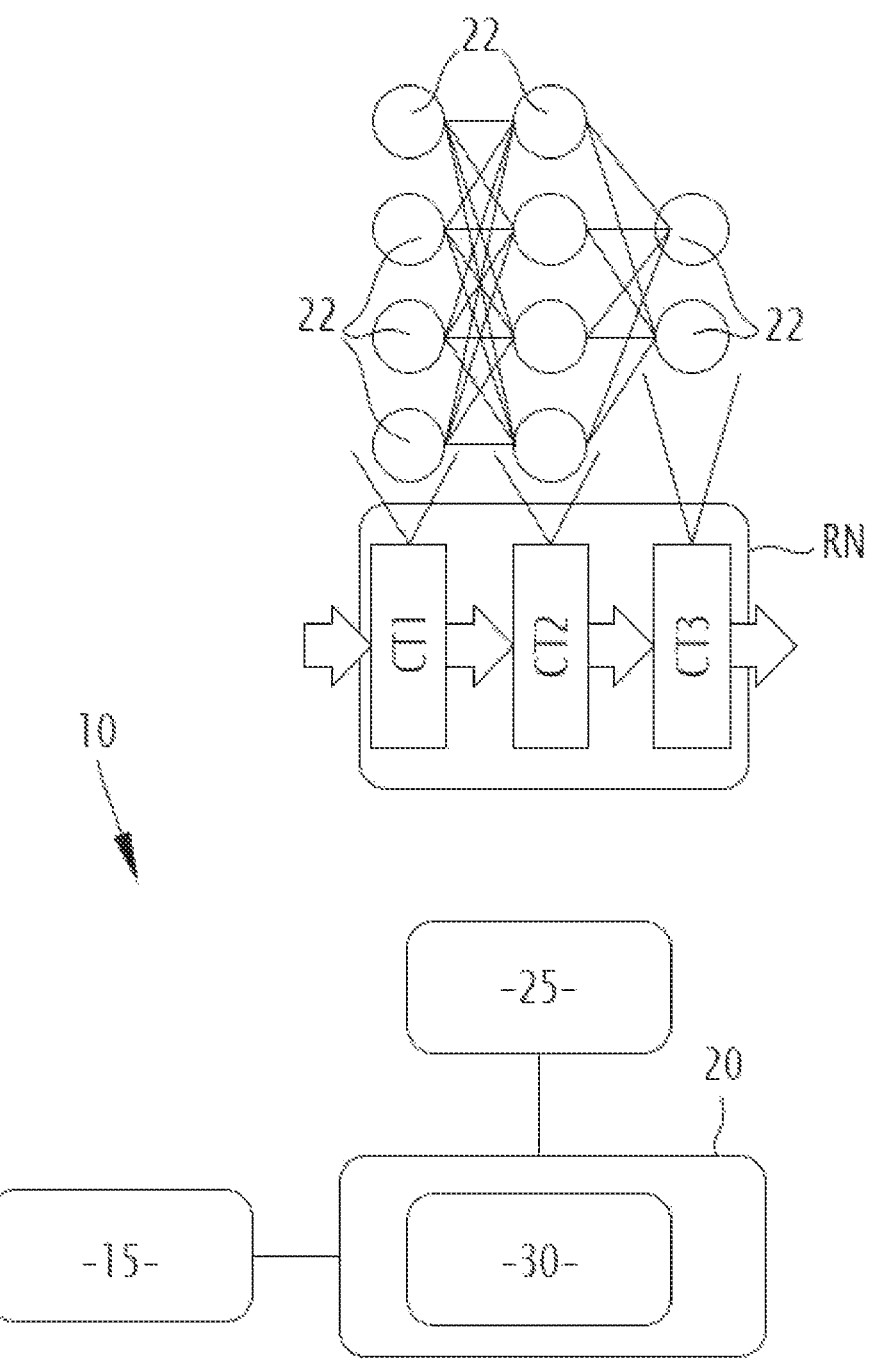
FIG. 1 is a schematic representation of an electronic system for processing objects according to the invention, comprising a sensor and an electronic calculator connected to the sensor, the calculator being configured to process, via the implementation of an artificial neural network, at least one object from the sensor.

In FIG. 1, an electronic object processing system 10 is configured to process one or more objects, not shown, and comprises a sensor 15 and an electronic calculator 20 connected to the sensor 15, the calculator 20 being configured to process at least one object from the sensor 15.

The electronic processing system 10 is, for example, an object detection electronic system, whereby the sensor 15 is an object detector and the calculator 20 is configured to process at least one object detected by the object detector.

The electronic processing system 10 forms, for example, a face detector which is able to recognise the faces of previously identified persons and/or to detect the faces of unknown persons, i.e. the faces of persons who have not been previously identified. The calculator 20 can then learn the identities of detected persons, and also identify unknown persons.

Alternatively, the electronic processing system 10 is an electronic image segmentation system, the sensor 15 being an image sensor and the calculator 20 being configured to perform a segmentation of each image from the image sensor.

The sensor 15 is known per se. The sensor 15 is, for example, an object detector configured to detect one or more objects, or an image sensor configured to take one or more images of a scene, and transmit them to the calculator 20.

Alternatively, the sensor 15 is a sound sensor, an object detection sensor, such as a lidar sensor, a radar sensor, an infrared sensor, a capacitive proximity sensor, an inductive proximity sensor, a Hall effect proximity sensor or a presence sensor, configured to acquire a characteristic signal as a function of the presence or absence of object(s) and then to transmit it to the calculator 20.

The calculator 20 is configured to process a set of data, the set of data typically corresponding to one or more signals captured by the sensor 15. The calculator 20 is then typically configured to interpret a scene captured by the sensor 15, i.e. to identify and/or to recognise a type of one or more elements—such as people or physical objects—present in the captured scene and corresponding to the signal or signals captured by the sensor 15.

The calculator 20 is configured to perform data processing, in particular classifying data, via the implementation of an artificial neural network RN, the latter typically comprising several successive processing layers CTi, where i is an integer index greater than or equal to 1. In the example shown in FIG. 1, the index i is for example 1, 2 and 3 respectively, with first CT1, second CT2 and third CT3 processing layers shown in this FIG. 1. Each respective processing layer CTi comprises, as known per se, one or more artificial neurons 22, also called formal neurons.

The processing layers CTi are typically arranged successively within the neural network RN, and the artificial neurons 22 of a given processing layer are typically connected at their input to the artificial neurons 22 of the previous layer, and at their output to the artificial neurons 22 of the next layer. The artificial neurons 22 of the first layer, such as the first processing layer CT1, are connected on the input side to the input variables, not shown, of the neural network RN, and the artificial neurons 22 of the last processing layer, such as the third processing layer CT3, are connected on the output side to the output variables, not shown, of the neural network RN. In the example shown in FIG. 1, the second processing layer CT2 then forms an intermediate layer whose artificial neurons 22 are connected on the input side to the artificial neurons 22 of the first processing layer CT1, and on the output side to the artificial neurons 22 of the third processing layer CT3.

As is known per se, each artificial neuron 22 has an associated operation, i.e. a type of processing, to be performed by said artificial neuron 22 within the corresponding processing layer. Each artificial neuron 22 is typically adapted to perform a weighted sum of input value(s) and then apply an activation function to the weighted sum to provide an output value, each input value being received from a respective element connected on the input side to said neuron 22 and multiplied by a synaptic weight associated with the connection between said neuron 22 and the respective element. The respective element connected to an input of said neuron 22 is an input variable of the neural network RN when said neuron belongs to a first layer, also called the input layer, of said neural network RN; or is a neuron of a previous layer of the neural network RN when said neuron belongs to an intermediate layer or to a last layer, also called the output layer, of the neural network RN. As is well known, the activation function, also known as the thresholding function or transfer function, makes it possible to introduce a non-linearity into the processing carried out by each artificial neuron. Classical examples of such an activation function are the sigmoid function, the hyperbolic tangent function, and the Heaviside function, and the linear rectification unit function, also called ReLU (Rectified Linear Unit). As an optional addition, the artificial neuron 22 is also able to additionally apply a bias to the output of the activation function, and the value delivered to the output-connected element(s) is then the product of the bias value and the output value of the activation function.

The neural network RN is for example a convolutional neural network, and the processing layers CT1, CT2, CT3 are then typically each selected from the group consisting of: a convolution layer, a batch normalisation layer, a pooling layer, a correction layer and a fully connected layer.

In the example shown in FIG. 1, a training module 25, external to the calculator 20, is configured to perform a training, also called learning, of the neural network RN.

In the example shown in FIG. 1, the calculator 20 then comprises only an inference module 30 configured to infer the previously-trained neural network RN for the processing, including classification, of data received as input from the calculator 20. The calculator 20 is then configured to use the previously trained neural network RN to calculate new output values from new input values. In other words, it is configured to perform only the inference of the neural network RN.

The calculator 20 is preferably an embedded computer, and is typically implemented as a processor or microcontroller.

The calculator 20 preferably includes integer operators and integer registers for the inference of said neural network RN.

In the example shown in FIG. 1, the training module 25 is implemented as software, i.e. as a computer program. It is further adapted to be recorded on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program comprising software instructions.

In the example of FIG. 1, the inference module 30 is in the form of a programmable logical component, such as a FPGA (Field Programmable Gate Array), or as a dedicated integrated circuit, such as an ASIC (Application-Specific Integrated Circuit).

Alternatively, not shown, the calculator 20 comprises both the training module 25 and the inference module 30. According to this variant, the learning module 25 and the inference module 30 are each in the form of a programmable logical component, such as an FPGA, or as a dedicated integrated circuit, such as an ASIC. According to this variant, the calculator 20 is then configured to perform both the training and the inference of the neural network RN. According to this variant, only the inference module 30 preferably has integer operators and integer registers. According to this variant, the training module 25 then preferably comprises floating-point operators and floating-point registers.

The training module 25 is configured to train the neural network RN, in particular of the synaptic weight values of at least one layer CT1, CT2, CT3 of the neural network RN, and preferably of each layer CT1, CT2, CT3 of said neural network RN.

The training module 25 is configured to train said synaptic weight values from training data, each weight value from said training being a quantized weight value belonging to a set EQA, EQS of quantized values.

Figure 2:
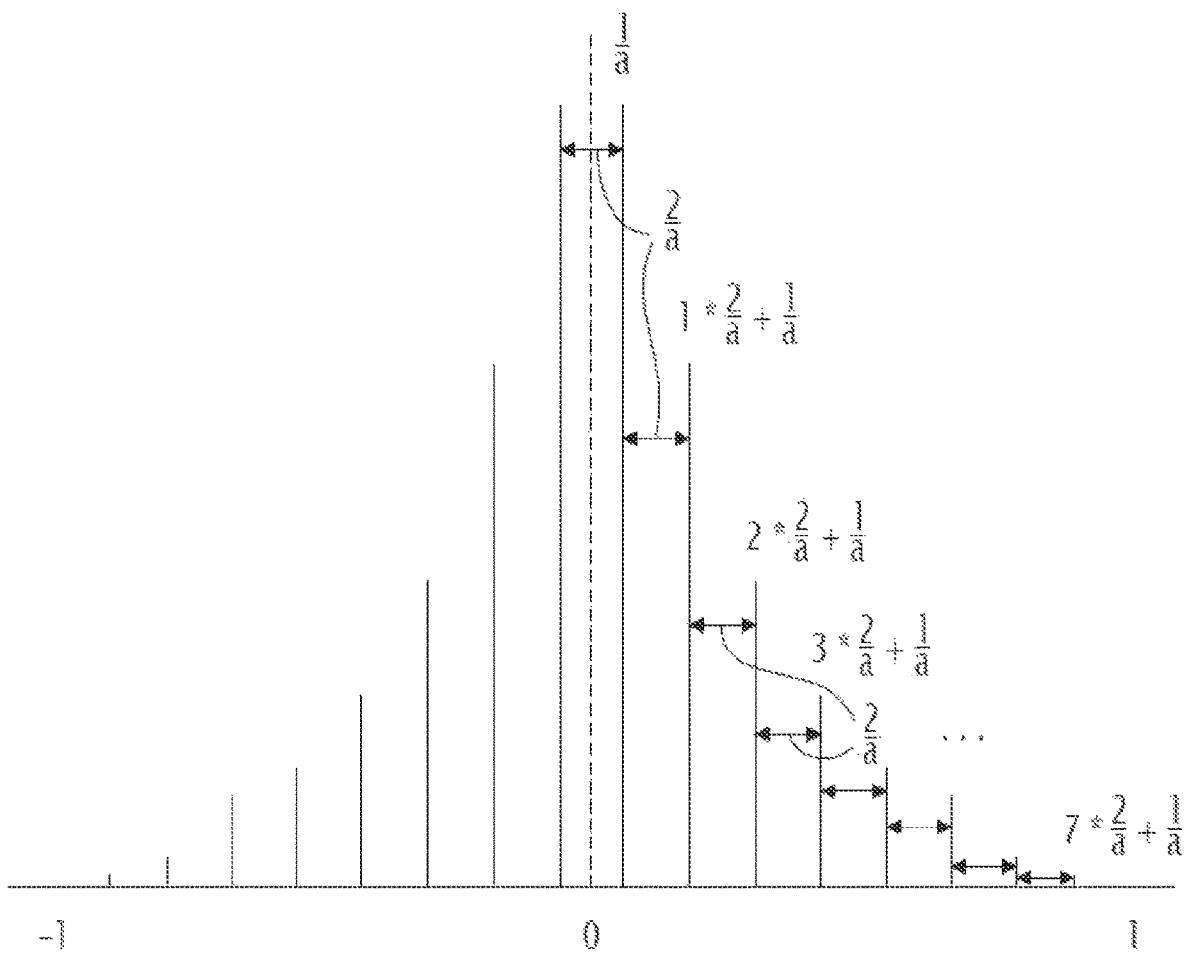
FIG. 2 is a schematic representation of a set of 4-bit quantized values of the prior art, used for training the weight values of the neural network.

According to the prior art, in particular according to the DoReFa quantization algorithm used by the SAT method, and as represented in FIG. 2, the set of quantized values consisting of values encoded with a predefined number B of bits, and with a quantization step $P_{ANT}$ between two successive quantized values satisfying the following equation:

$$P_{ANT} = \frac{2}{2^B - 1} \qquad [1]$$

the quantized values also being included in a predefined interval, also called the quantization interval, equal to [−1; 1].

In FIG. 2, the quantization step $P_{ANT}$ corresponds to 2/a, with a then equal to $2^B−1$.

Figure 3:
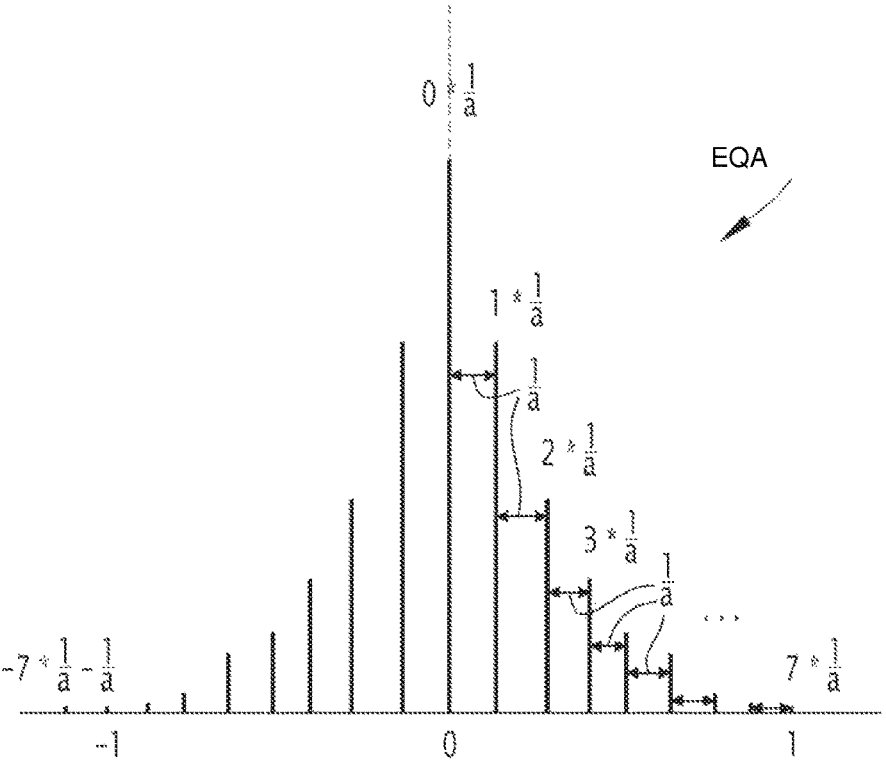
FIG. 3 is a view similar to FIG. 2, for two examples according to the invention.
Figure 3:
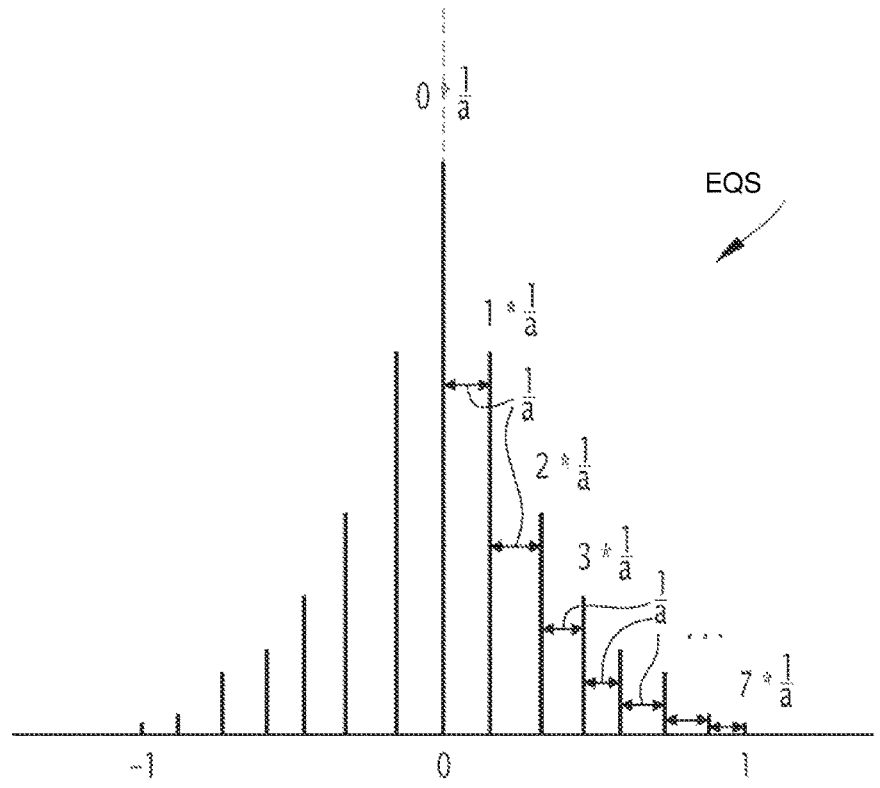

According to the invention and as represented in FIG. 3, the set of quantized values EQA, EQS consists of values encoded with a predefined number B of bits, and with a quantization step P between two successive quantized values satisfying the following equation:

$$P = \frac{1}{\left\lfloor \dfrac{2^B - 1}{2} \right\rfloor} = \frac{1}{2^{B-1} - 1} \qquad [2]$$

where $\lfloor \cdot \rfloor$ represents the integer part function;
the quantized values also being included in the quantization interval chosen from the interval [−1−P; 1] and the interval [−1; 1].

In FIG. 3, the quantization step P corresponds to 1/a, with a then equal to $$\left\lfloor \frac{2^B - 1}{2} \right\rfloor,$$

also equal to $2^{B-1}−1$.

The predefined number of bits B is for example greater than or equal to 8; and preferably between 3 and 5.

In addition, the set of quantized values EQA, EQS includes the null value. In comparison, the person skilled in the art will observe that the set of quantized values according to the prior art does not include the null value, as can be seen in FIG. 2.

In FIG. 3, according to a first example of the invention, the set of quantized values is a set of quantized values asymmetrical with respect to the null value, and is then denoted EQA.

Following this first example, the set of quantized values EQA typically satisfies the following equation:

$$EQA=\{-1-P+i\cdot P; i \in [0;2^B-1]\}=\{i-P; i \in [-2^{B-1};2^{B-1}-1]\} \qquad [3]$$

the quantization interval being then equal to the interval [−1−P; 1].

According to a second example of the invention, the set of quantized values is a set of quantized values symmetrical with respect to the null value, and is then denoted EQS.

Following this second example, the set of quantized values EQS typically satisfies the following equation:

$$EQS=\{-1+i\cdot P; i \in [0;2^B-2]\}=\{i\cdot P; i \in [-(2^{B-1}-1);2^{B-1}-1]\} \qquad [4]$$

the quantization interval being then equal to the interval [−1; 1].

In addition, the training module 25 is configured to convert, via a quantization function, each trained weight value into the respective quantized weight value belonging to the quantization interval EQA, EQS.

For example, the quantization function satisfies the following equation:

$$F_Q(W) = P \cdot \text{round}\left(\frac{W}{P}\right) \qquad [5]$$

where $F_Q$ represents the quantization function;
W represents a respective weight value;
P represents the quantization step; and
round represents a rounding operation (rounding to the nearest integer, or to the smallest/largest integer, or truncation)

As an optional addition, the training module 25 is configured to perform an initial training of the synaptic weight values from the training data, each trained weight value being further converted via a transpose function into a bounded weight value belonging to a predefined, so-called bounding interval.

According to this optional addition, the training module 25 is configured to perform the training according to the set of quantized values EQA, EQS, after the initial training and from the bounded weight values obtained during the initial training; the initial training forming a first training of the neural network RN, and the training according to the set of quantized values EQA, EQS forming a second training of the neural network RN, subsequent to the first training.

According to this optional addition, the bounding interval is preferably equal to the quantization interval.

According to this optional addition and for the first example of the set of quantized values, i.e. for the asymmetric set of quantized values EQA, the transpose function satisfies for example the following equation:

$$F_{CA}(W_{i,j}) = \left(1 + \frac{P}{2}\right) \cdot \left(\frac{\tan h(W_{i,j})}{\max_{r,s} |\tan h(W_{r,s})|}\right) - \frac{P}{2} \qquad [6]$$

where $F_{CA}$ represents a first transpose function, also called the asymmetric transpose function;
$W_{i,j}$ represents a weight value from a matrix W of weight values;
P represents the quantization step;
tan h represents the hyperbolic tangent function;
$|\cdot|$ represents the absolute value function;
max represents the maximum function;

the quantization interval being then equal to the interval [−1−P; 1].

The skilled person will then understand that the weights for which the value has been converted into a respective bounded value via the first transpose function $F_{CA}$ during the first training, and then quantized into a respective quantized value via the quantization function $F_Q$ during the second training, then belong to the set of asymmetrical quantized values EQA, i.e. that said respective quantized value, obtained at the end of the second training, is included in the set of asymmetrical quantized values EQA.

According to this optional addition and for the second example of the set of quantized values, i.e. for the symmetric set of quantized values EQS, the transpose function satisfies for example the following equation:

$$F_{CS}(W_{i,j}) = \frac{\tan h(W_{i,j})}{\max_{r,s}|\tan h(W_{r,s})|} \qquad [7]$$

where $F_{CS}$ represents a second transpose function, also called the symmetric transpose function;

$W_{i,j}$ represents a weight value from a matrix W of weight values;

tan h represents the hyperbolic tangent function;

|·| represents the absolute value function;

max represents the maximum function;

the quantization interval being then equal to the interval [−1; 1].

Likewise, the skilled person will understand that the weights for which the value has been converted into a respective bounded value via the second transpose function $F_{CS}$ during the first training, and then quantized into a respective quantized value via the quantization function $F_Q$ during the second training, then belong to the set of symmetrical quantized values EQS, i.e. that said respective quantized value, obtained at the end of the second training, is included in the set of asymmetrical quantized values EQS.

The inference module 30 is configured to infer the previously trained neural network RN. According to the invention, the inference module 30 is preferably configured to perform the weighted sum of input value(s) and then apply the activation function to the weighted sum via integer and/or fixed=point operators and integer and/or fixed-point registers. The registers are typically registers of up to 8 bits.

In other words, according to this preferred aspect, the inference is performed via a fixed-point calculation, for example using a regular integer arithmetic and logic unit.

As an optional addition, the inference module 30 is configured to, during neural network inference, multiply the trained quantized weight values by an integer multiple equal to $$\left\lfloor \frac{2^B - 1}{2} \right\rfloor,$$

also equal to $2^{B-1}-1$, with B representing the predefined number of bits used for encoding the quantized weight values and $\lfloor \cdot \rfloor$ representing the integer part function.

According to this optional addition, the inference module 30 is for example configured to apply the activation function according to the following equation:

$$A(Q) = \qquad [8]$$

$$\frac{\alpha_2}{I_2} * \text{round}\left( \frac{I_2}{\alpha_2} \frac{\alpha_1}{I_1} Y \frac{1}{\left\lfloor \frac{I_w}{2} \right\rfloor} * \text{clip}\left( (Q*n) + \frac{\beta}{Y} \frac{I_1}{\alpha_1} \left\lfloor \frac{I_w}{2} \right\rfloor; 0; \frac{I_2}{Y} \frac{I_1}{\alpha_1} \left\lfloor \frac{I_w}{2} \right\rfloor \right) \right)$$

where A represents a global activation function for the fusion of a convolution layer and a subsequent batch normalisation layer;

Q are the weights belonging to the interval $$\left[ -\left\lfloor \frac{I_w}{2} \right\rfloor, \left\lfloor \frac{I_w}{2} \right\rfloor \right],$$

$I_1$ is an integer equal to $2^{Bc}-1$, with Bc representing a predefined number of bits used for encoding the previous batch normalisation layer;

$I_2$ is an integer equal to $2^{Bn}-1$, with Bcn representing a predefined number of bits used for encoding the current batch normalisation layer;

$I_w$ is an integer equal to $2^{Bw}-1$, with Bw representing a predefined number of bits used for encoding the weights of the convolution layer; n is an integer, corresponding to the output of the rounding operation of the previous layer;

$\beta$ and Y are parameters of the current batch normalization layer;

$\alpha_1$, $\alpha_2$ are parameters of the clip activation function defined below, $\alpha_1$ being associated with the activation function of the previous batch normalization layer and $\alpha_2$ with that of the current batch normalization layer;

$\lfloor \cdot \rfloor$ represents the integer part function;

round represents a rounding operation (rounding to the nearest integer, or to the smallest/largest integer, or truncation)

clip represents an activation function that satisfies the following equation:

$$\text{clip}(x; 0; \alpha_i) = \frac{1}{2}(|x| - |x - \alpha_i| + \alpha_i) \qquad [9]$$

According to this optional addition, the inference module 30 then allows, as it were, to merge the batch normalisation layer with the previous convolution layer, in order to infer these two layers as a single layer, additionally taking into account the quantization of the weights and activations of the merged layers, carried out during the training.

This optional addition makes it possible, in other words, to increase the speed of inference by absorbing the parameters, i.e. 3 and Y, of the batch normalisation layer into the convolution layer. The skilled person will indeed observe that the batch normalization layer plays an important role during the training of the convolutional neural network, but that it is not necessary during the inference, so that the merging—during the inference—of this batch normalization layer with the previous convolution layer does not impact the result of the inference, while making it possible to increase its speed.

Figure 4:
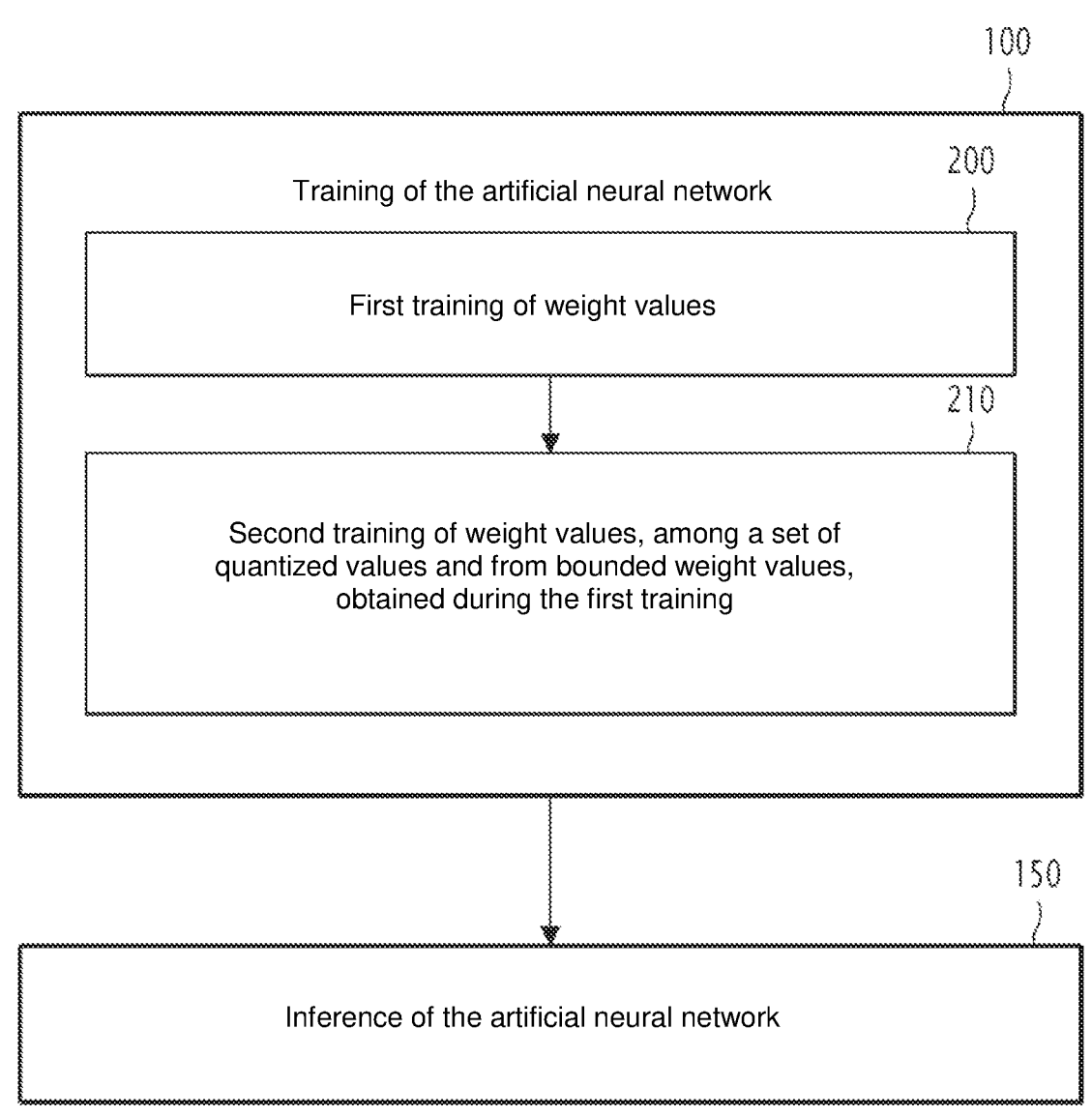
FIG. 4 is a flowchart of a method according to the invention for data processing, in particular for classifying data, the method being implemented by the electronic calculator of FIG. 1, implementing the artificial neural network.

The operation of the calculator 20 according to the invention will now be explained with reference to FIG. 4 depicting a flow chart of a data processing method, in particular for classifying data, via the implementation of the artificial neural network RN with the calculator 20, the method comprising a training phase 100 in which a method, according to the invention, of training synaptic weight values of at least one layer CT1, CT2, CT3 of the neural network 15 is implemented, then an inference phase 150 in which the artificial neural network RN, previously trained, is used to calculate output values, in order to process, in particular to classify, i.e. sort, said data.

As described above, the training phase 100 is preferably implemented by a computer, this training phase 100 being performed by the training module 25, which is typically a software module. The subsequent inference phase 150 is preferably implemented by the calculator 20, and more precisely by its inference module 30. In particular, the training phase 100 according to the invention then allows implementation of the inference phase 150 via integer and/or fixed-point operators and integer and/or fixed-point registers, the inference module 30 preferably comprising such integer and/or fixed-point operators and such integer and/or fixed-point registers, the inference module 30 preferably still consisting of such integer and/or fixed-point operators and registers.

The training phase 100 comprises a step 200 of initial training of the neural network RN, in particular of the synaptic weight values of said network, this initial training step 200 forming the first training of the neural network.

The training itself of the neural network RN is known per se, and is carried out from the training data. This training is carried out via a back-propagation algorithm for the calculation of the gradient of each parameter of the neural network RN, in particular of each synaptic weight.

The parameters of the neural network RN are the values associated with each artificial neuron 22 of said corresponding processing layer CTi and capable of being determined via a training of the neural network RN, these parameters typically comprising for each artificial neuron 22 a weight value, an activation, i.e. an activation function, or even a bias value, respectively.

In this initial training step 200, each trained weight value is further converted, via the transpose function, into a bounded weight value belonging to the predefined bounding interval.

The transpose function used for this conversion in the first training 200 is, for example, the first transpose function $F_{CA}$, and the conversion is then typically performed according to the preceding equation (6).

Alternatively, the transpose function used for the conversion in the first training 200 is the second transpose function $F_{CS}$, and the conversion is then typically performed according to the previous equation (7).

During the training phase 100, at the end of the first training 200, the training module 25 then performs a step 210 of training the weight values of the neural network RN from training data, each weight value resulting from said training being a quantized weight value belonging to the set of quantized values EQA, EQS, this training step 210 then forming the second training of the neural network RN.

In the training step 210, training is for example also performed via the back-propagation algorithm to calculate the gradient of each parameter of the neural network RN, in particular of each synaptic weight.

According to the invention, during this training step 210, the set of quantized values EQA, EQS consists of values encoded with a predefined number B of bits, with a quantization step P between two successive quantized values satisfying the preceding equation (2).

In the training step 210, in order for each weight value from said training to be a quantized weight value belonging to the set of quantized values EQA, EQS, each trained weight value is, for example, converted via the quantization function, such as according to the preceding equation (5), into the respective quantized weight value belonging to the quantization interval.

When the weights have been converted via the first transpose function $F_{CA}$ in the first training 200, their quantized value obtained from the second training 210 is included in the asymmetric quantized value set EQA.

Likewise, when the weights have been converted via the second transpose function $F_{CS}$ in the first training 200, their quantized value obtained from the second training 210 is included in the symmetric quantized value set EQS.

At the end of the training phase 100, the weight values resulting from said training are then included in the set of quantized values EQA, EQS for the layer(s) that have been trained.

During the inference phase 150, the inference module 30 infers the artificial neural network RN to process, in particular to classify, the data received as input from the electronic calculator 20, the neural network RN having been trained beforehand during the training phase 100.

During this inference phase 150, the inference module 30 performs, in particular, for each artificial neuron 22, the weighted sum of input value(s), then applies the activation function to the weighted sum. This inference is preferably carried out via integer and/or fixed-point operators and integer and/or fixed-point registers, in particular for the artificial neurons 22 of the convolution layer(s), or even additionally for those of the batch normalization layer(s).

The registers are preferably still registers of at most 8 bits, and in particular B-bit registers, where B is the predefined number of bits used in the training phase 100, in particular for encoding the quantized weight values.

In the inference phase 150, the inference module 30 then typically multiplies the quantized weight values, trained in the training phase 100, by the integer multiple equal to $$\left\lfloor \frac{2^B - 1}{2} \right\rfloor,$$

also equal to $2^{B-1}-1$, with $\lfloor \cdot \rfloor$ representing the integer part function.

As an optional addition, the inference module 30 applies the activation function according to the preceding equations (8) and (9).

This optional addition then merges the batch normalisation layer with the previous convolution layer, in order to infer these two layers as a single layer, and thus more quickly.

The training method according to the invention then allows the inference phase 150 to be performed via integer and/or fixed-point operators and integer and/or fixed-point registers, while maintaining good performance, as shown in Table 1 below.

TABLE 1

| B | Set of quantized values | Training Performance | Inference Performance |
|---|---|---|---|
| 5 | Prior art | 72.23% | 0% (72.11%) |
|   | EQS | 72.24% | 72.19% |
|   | EQA | 72.21% | 72.21% |

15

TABLE 1-continued

| B | Set of quantized values | Training Performance | Inference Performance |
|---|---|---|---|
| 4 | Prior art | 71.80% | 0% (71.74%) |
|   | EQS | 71.72% | 71.74% |
|   | EQA | 71.55% | 71.48% |
| 3 | Prior art | 68.45% | 0% (68.41%) |
|   | EQS | 67.48% | 67.45% |
|   | EQA | 62.83% | 62.82% |

In Table 1 above, performance typically represents a recognition rate, i.e. a correct classification rate, when the inference is aimed at classifying the data received as input by the calculator 20. The performance shown in the column entitled "Training Performance" is the performance measured in the 100 training phase with floating-point weights and activations. The performance shown in the column entitled "Inference Performance" is the performance measured in the inference phase 150 with integer weights and activations, where the number of bits used to represent these integers is equal to the number B for weights, and eight for activations.

The skilled person will then observe that with the training method of the prior art, the results obtained subsequently during the inference phase are extremely degraded, with zero performance, if the inference is carried out with integer weights where the number of bits used to represent these integers is equal to the number B used during the training phase. The training method of the prior art then makes it necessary to perform the inference phase with floating-point weights, which is less efficient; or with integers expressed on B+1 bits, which then makes it necessary to use registers and operators with at least one extra bit, which is also less efficient and more expensive. The performance of the prior art with B+1 bit integers is shown in brackets in Table 1 above for additional information.

Thus, the quantization according to the invention allows the use of fixed-point encoding, rather than floating-point encoding, for the inference of the neural network RN, which then allows a much more efficient implementation of said inference, as integer operations require less computation on most processor cores, including microcontrollers.

The invention claimed is:

1. A method, implemented by at least one processor of an electronic calculator, for training synaptic weight values of at least one layer of an artificial neural network, each artificial neuron of a respective layer being adapted to perform a weighted sum of input value(s) and then to apply an activation function to the weighted sum to provide an output value, each input value being received from a respective element connected to an input of said neuron and multiplied by a synaptic weight associated with the connection between said neuron and the respective element, the respective element being an input variable of the neural network or a neuron of a preceding layer of the neural network, the method comprising:
   training the weight values of the neural network from training data, each weight value obtained from said training being a quantized weight value belonging to a set of quantized values;
   wherein the set of quantized values consists of values encoded with a predefined number B of bits, and with a quantization step P between two successive quantized values that satisfies:

16

$$P = \frac{1}{\left\lfloor \frac{2^B - 1}{2} \right\rfloor}$$

where $\lfloor \cdot \rfloor$ represents the integer part function;
   the quantized values also being included in a predefined interval, also called quantization interval, the quantization interval being chosen from the interval $[-1-P; 1]$ and the interval $[-1; 1]$,
   the method further comprising inferring the previously trained artificial neural network, for the processing, in particular the classification, of data received at input of the electronic calculator,
   the inferring including performing the weighted sum of input value(s) and then applying the activation function to the weighted sum via integer and/or fixed-point operators and integer and/or fixed-point registers.

2. The method according to claim 1, wherein the set of quantized values includes the null value.

3. The method according to claim 1, wherein the set of quantized values satisfies the following equation:

$$EQA=\{-1-P+i \cdot P; i \in [0; 2^B-1]\}=\{i \cdot P; i \in [-2^{B-1}; 2^{B-1}-1]\}$$

the quantization interval being then equal to the interval $[-1-P; 1]$.

4. The method according to claim 1, wherein the set of quantized values satisfies the following equation:

$$EQS=\{-1+i \cdot P; i \in [0; 2^B-2]\}=\{i \cdot P; i \in [-(2^{B-1}-1); 2^{B-1}-1]\}$$

the quantization interval being then equal to the interval $[-1; 1]$.

5. The method according to claim 1, wherein the method further comprises the following step:
   initial training of the weight values of the neural network from the training data, each learned weight value being furthermore converted, via a transpose function, into a bounded weight value belonging to a predefined interval, also called bounding interval;
   the training step being carried out after the initial training step and from the bounded weight values obtained during the initial training; the initial training step forming a first training of the neural network, and the training step forming a second training of the neural network, subsequent to the first training.

6. The method according to claim 5, wherein the bounding interval is equal to the quantization interval.

7. The method according to claim 5, wherein the transpose function satisfies the following equation:

$$F_{CA}(W_{i,j}) = \left(1 + \frac{P}{2}\right) \cdot \left(\frac{\tan h(W_{i,j})}{\max_{r,s} |\tan h(W_{r,s})|}\right) - \frac{P}{2}$$

where $F_{CA}$ represents a first transpose function, also called asymmetric transpose function;
$W_{i,j}$ represents a weight value from a matrix W of weight values;
P represents the quantization step;
tanh represents the hyperbolic tangent function;
$\lfloor \cdot \rfloor$ represents the absolute value function;
$\lfloor \cdot \rfloor$ represents the integer part function;
max represents the maximum function;
the quantization interval being then equal to the interval $[-1-P; 1]$.

8. The method according to claim 5, wherein the transpose function satisfies the following equation:

$$F_{CS}(W_{i,j}) = \frac{\tan h(W_{i,j})}{\max_{r,s}|\tan h(W_{r,s})|}$$

where $F_{CS}$ represents a second transpose function, also called symmetric transpose function;
$W_{i,j}$ represents a weight value from a matrix W of weight values;
tanh represents the hyperbolic tangent function;
$\lfloor \cdot \rfloor$ represents the absolute value function;
max represents the maximum function;
the quantization interval being then equal to the interval [−1; 1].

9. The method according to claim 1, wherein in the training step, each trained weight value is converted via a quantization function into the respective quantized weight value belonging to the quantization interval.

10. The method according to claim 9, wherein the quantization function satisfies the following equation:

$$F_Q(W) = P \cdot \text{round}\left(\frac{W}{P}\right)$$

where $F_Q$ represents the quantization function;
W represents a respective weight value;
P represents the quantization step; and
round a rounding operation.

11. The method according to claim 1, wherein the predefined number B of bits is less than or equal to 8.

12. The method according to claim 11, wherein the predefined number of bits B is between 3 and 5.

13. The method according to claim 1, wherein the artificial neural network is configured to process data.

14. The method according to claim 13, wherein the artificial neural network is configured to classify data.

15. The method according to claim 1, wherein the artificial neural network is configured to be implemented by an electronic calculator connected to a sensor, for processing at least one object from the sensor.

16. A non-transitory computer-readable medium including a computer program comprising software instructions which, when executed by a computer, implement a training method according to claim 1.

17. An electronic calculator for processing data, via the implementation of a network of artificial neurons, each artificial neuron of a respective layer of the neural network being adapted to perform a weighted sum of input value(s) and then to apply an activation function to the weighted sum to provide an output value, each input value being received from a respective element connected to an input of said neuron and multiplied by a synaptic weight associated with the connection between said neuron and the respective element, the respective element being an input variable of the neural network or a neuron of a preceding layer of the neural network,
the calculator comprising:
at least one processor configured to
train the weight values of the neural network from training data, each weight value obtained from said training being a quantized weight value belonging to a set of quantized values;

wherein the set of quantized values consists of values encoded with a predefined number B of bits, and with a quantization step P between two successive quantized values that satisfies:

$$P = \frac{1}{\left\lfloor \dfrac{2^B - 1}{2} \right\rfloor}$$

where $\lfloor \cdot \rfloor$ represents the integer part function;
the quantized values also being included in a predefined interval, also called quantization interval, the quantization interval being chosen from the interval [−1−P; 1] and the interval [−1; 1],
infer the previously trained artificial neural network, for the processing, in particular the classification, of data received at input of the electronic calculator,
perform the weighted sum of input value(s) and then apply an activation function to the weighted sum via integer and/or fixed-point operators and integer and/or fixed-point registers.

18. The calculator according to claim 17, wherein the registers are registers of up to 8 bits.

19. The calculator according to claim 17, wherein trained quantized weight values are multiplied by an integer multiple equal to $$\left\lfloor \frac{2^B - 1}{2} \right\rfloor$$

for the inference of the neural network, with B representing the predefined number of bits used for encoding the quantized weight values and $\lfloor \cdot \rfloor$ representing the integer part function.

20. The calculator according to claim 17, wherein the activation function is applied according to the following equation:

$$A(Q) =$$

$$\frac{\alpha_2}{I_2} * \text{round}\left(\frac{I_2}{\alpha_2}\frac{\alpha_1}{I_1}Y\frac{1}{\left\lfloor\frac{I_w}{2}\right\rfloor} * \text{clip}\left((Q*n) + \frac{\beta}{Y}\frac{I_1}{\alpha_1}\left\lfloor\frac{I_w}{2}\right\rfloor; 0; \frac{I_2}{Y}\frac{I_1}{\alpha_1}\left\lfloor\frac{I_w}{2}\right\rfloor\right)\right)$$

where A represents a global activation function for the fusion of a convolution layer and a subsequent batch normalisation layer;
Q are the weights belonging to the interval $$\left[-\left\lfloor\frac{I_w}{2}\right\rfloor, \left\lfloor\frac{I_w}{2}\right\rfloor\right],$$

$I_1$ is an integer equal to $2^{Bc}-1$, with Bc representing a predefined number of bits used for encoding the previous batch normalisation layer;
$I_2$ is an integer equal to $2^{Bn}-1$, with Bn representing a predefined number of bits used for encoding the current batch normalisation layer;
$I_w$ is an integer equal to $2^{Bw}-1$, with Bw representing a predefined number of bits used for encoding the weights of the convolution layer; n is an integer, corresponding to the output of the rounding operation of the previous layer;

$\beta$ and Y are parameters of the current batch normalization layer;

$\alpha_1$, $\alpha_2$ are parameters of the clip activation function defined below, $\alpha_1$ being associated with the activation function of the previous batch normalization layer and $\alpha_2$ with that of the current batch normalization layer;

$\lfloor \cdot \rfloor$ represents the integer part function;

round represents a rounding operation;

clip represents an activation function that satisfies the following equation:

$$\text{clip}(x; 0; \alpha_i) = \frac{1}{2}(|x| - |x - \alpha_i| + \alpha_i).$$

21. An electronic system for processing object(s), comprising a sensor and an electronic calculator connected to the sensor, the calculator being configured to process at least one object from the sensor, wherein the calculator is according to claim 17.

* * * * *